(12) United States Patent
Kim et al.

(10) Patent No.: US 8,954,065 B2
(45) Date of Patent: Feb. 10, 2015

(54) METHOD OF COMMUNICATING DATA BASED ON AN UNLICENSED BAND IN A WIRELESS COMMUNICATION SYSTEM

(75) Inventors: Sang Gook Kim, San Diego, CA (US);
Ki Dong Lee, San Diego, CA (US);
Dong Wook Roh, San Diego, CA (US);
Li-Hsiang Sun, San Diego, CA (US)

(73) Assignee: LG Electronics Inc., Seoul (KR)

( * ) Notice: Subject to any disclaimer, the term of this patent is extended or adjusted under 35 U.S.C. 154(b) by 510 days.

(21) Appl. No.: 13/302,567

(22) Filed: Nov. 22, 2011

(65) Prior Publication Data

US 2012/0129522 A1    May 24, 2012

Related U.S. Application Data

(60) Provisional application No. 61/417,127, filed on Nov. 24, 2010.

(51) Int. Cl.
| | |
|---|---|
| *H04W 24/00* | (2009.01) |
| *H04W 72/04* | (2009.01) |
| *H04W 16/14* | (2009.01) |
| *H04W 72/08* | (2009.01) |
| *H04W 84/04* | (2009.01) |

(52) U.S. Cl.
CPC .......... *H04W 72/0426* (2013.01); *H04W 16/14* (2013.01); *H04W 72/082* (2013.01); *H04W 84/045* (2013.01)
USPC .......................................... 455/434; 370/252

(58) Field of Classification Search
USPC ........ 370/252, 328; 455/434, 450, 454, 452.1
See application file for complete search history.

(56) References Cited

U.S. PATENT DOCUMENTS

| | | | | |
|---|---|---|---|---|
| 2004/0203815 A1* | 10/2004 | Shoemake et al. | ............ | 455/450 |
| 2010/0255848 A1 | 10/2010 | Abraham et al. | | |
| 2012/0250565 A1* | 10/2012 | Zhang et al. | .................. | 370/252 |
| 2013/0265901 A1* | 10/2013 | Pedersen et al. | ............. | 370/252 |

FOREIGN PATENT DOCUMENTS

| | | |
|---|---|---|
| JP | 2012-521729 A | 9/2012 |
| KR | 10-2010-0065062 A | 6/2010 |
| KR | 10-2010-0069063 A | 6/2010 |
| KR | 10-2010-0110746 A | 10/2010 |
| WO | 2010/111150 A2 | 9/2010 |

\* cited by examiner

*Primary Examiner* — Myron K Wyche
(74) *Attorney, Agent, or Firm* — Birch, Stewart, Kolasch & Birch, LLP

(57) ABSTRACT

A method for communicating data based on an unlicensed band in a wireless communication system comprising a first type network entity and a second type network entity which is different. The first type network entity comprises a cellular base station and the second type network entity comprises a Femto-cell base station. In the method, a cellular base station identifies at least one Femto-cell base station incurring interference and instructs the identified base station to operate on an unlicensed band. The technical features can be used to improve the performance of the wireless network, and/or to reduce the effect of interference.

16 Claims, 15 Drawing Sheets

METHOD OF COMMUNICATING DATA BASED ON AN UNLICENSED BAND IN A WIRELESS COMMUNICATION SYSTEM

CROSS-REFERENCE TO RELATED APPLICATIONS

The present application for patent claims priority to Provisional Application No. 61/417,127 filed on Nov. 24, 2010, which is incorporated by reference in its entirety herein.

BACKGROUND OF THE INVENTION

1. Field of the invention

The technical features of this document relate to wireless communications, and more particularly, to a method for communicating data based on an unlicensed band.

2. Related Art

The Third Generation Partnership Project (3GPP) Long Term Evolution (LTE) which is a set of enhancements to the Universal Mobile Telecommunications System (UMTS) is introduced as 3GPP Release 8. The 3GPP LTE uses orthogonal frequency division multiple access (OFDMA) for a downlink, and uses single carrier frequency division multiple access (SC-FDMA) for an uplink, and adopts multiple input multiple output (MIMO) with up to four antennas. In recent years, there is an ongoing discussion on 3GPP LTE-Advanced (LTE-A), which is a major enhancement to the 3GPP LTE.

The 3GPP system may further comprises a Home evolved Node B (HeNB). The HeNB is also referred to as a HBN (home NB), a Femto-cell, a home cellular base station, a Femto-cell BS, etc. Although the Femto-cell BS has a low radio transmission output power compared to a typical base station (BS) operated by mobile communication service providers, the quality of communication between cellular network entities can be affected by radio signals originated from the Femto-cell BS. Therefore, Interference management is one of the key factors in the successful deployment of Femto-cell BS. Interference is mainly caused by Femto-cell BSs using the same spectrum as that of cellular system. For example, downlink (DL) reception for a UE, which communicates with a cellular BS, can be interfered by DL transmission from a nearby Femto-cell BS.

SUMMARY OF THE INVENTION

The technical features of this document provide a method for communicating data based on an unlicensed band in a wireless communication system comprising a first type to network entity and a second type network entity which is different from the first type network entity. The technical features can be used to improve the performance of the wireless network, and/or to reduce the effect of interference.

In one aspect, the method comprises receiving first information associated with location of a user equipment (UE) connected to at least one of the first type network entity and the second type network entity; determining, based on the first information, whether to instruct the second type network entity to operate on the unlicensed band; and instructing the second type network entity to operate on the unlicensed band, wherein available radio resources for the unlicensed band are determined based on second information which is managed by the first type network entity.

The first type network entity can be a cellular base station, and the second type network entity can be a Femto-cell base station.

The UE can be only connected to the first type network entity, and the first information can contain a measurement result of reference signal reception power (RSRP) or reference signal reception quality (RSRQ) and an identity of at least one Femto-cell base station included in a neighboring cell list of the UE.

The method may further comprise identifying at least one Femto-cell base station incurring interference in downlink reception of the UE, wherein the second type network instructed by the first type network entity is the identified Femto-cell base station.

The second type network entity can be instructed to operate on the unlicensed band, when the UE's location is not near a cell boundary region between the cellular base station and the Femto-cell base station. This feature can be applicable to a case where an UE is not located between the cellular base stations and the second type network identity is identified close to the UE. This location information to identify near-by second network identity can be provided by the UE in RSRP, RSRQ, etc., or decided by the first type to network entity through, e.g., trilateration, etc.

The UE can be only connected to the second type network entity, the first type network entity can identify at least one Femto-cell base station incurring interference, and the second type network instructed by the first type network entity can be the identified Femto-cell base station. This feature can be applicable a case where an identified second type network is in the neighboring-cell list of the UE.

The second type network entity can be instructed to operate on the unlicensed band, when the UE's location is near a cell boundary region between the cellular base station and the Femto-cell base station.

The method may further comprise receiving, from the second type network entity, report information on which radio resources are used by the second type network entity.

The unlicensed band can include Industrial, Scientific and Medical (ISM) bands, and Television White Spaces (TVWS) bands.

The second information can be obtained from a database managed by a central entity different from the first and second type network entities.

In another aspect, the method performed by the second type network entity comprises receiving first information associated with location of a user equipment (UE) connected to at least one of the first type network entity and the second type network entity; determining, based on the first information, whether to operate on the unlicensed band; and enabling the second type network entity to operate on the unlicensed band, wherein available radio resources for the unlicensed band are determined by second information which is managed by the first type network entity. In one design, the step of determining can be performed by an entity belonging to the first type network.

In another aspect, the method associated with a system comprising a first Femto-cell base station and a second Femto-cell base station comprises receiving first information associated with location of a user equipment (UE) connected to at least one of the first Femto-cell base station and the second Femto-cell base station; determining whether to operate on the unlicensed band, wherein the determination is based on the first information; and enabling the first Femto-cell to operate on the unlicensed band, wherein available radio resources for the unlicensed band are determined by second information which is managed by a cellular system.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). The $3^{rd}$ generation partnership project (3GPP) long term evolution (LTE) is a part of an evolved UMTS (E-UMTS) using the E-UTRA. The 3GPP LTE uses the OFDMA in the downlink and uses the SC-FDMA in the uplink.

For clarity of explanation, the following description will focus on the 3GPP LTE or the 3GPP LTE-A. However, the technical features of this description are not limited thereto.

Figure 1:
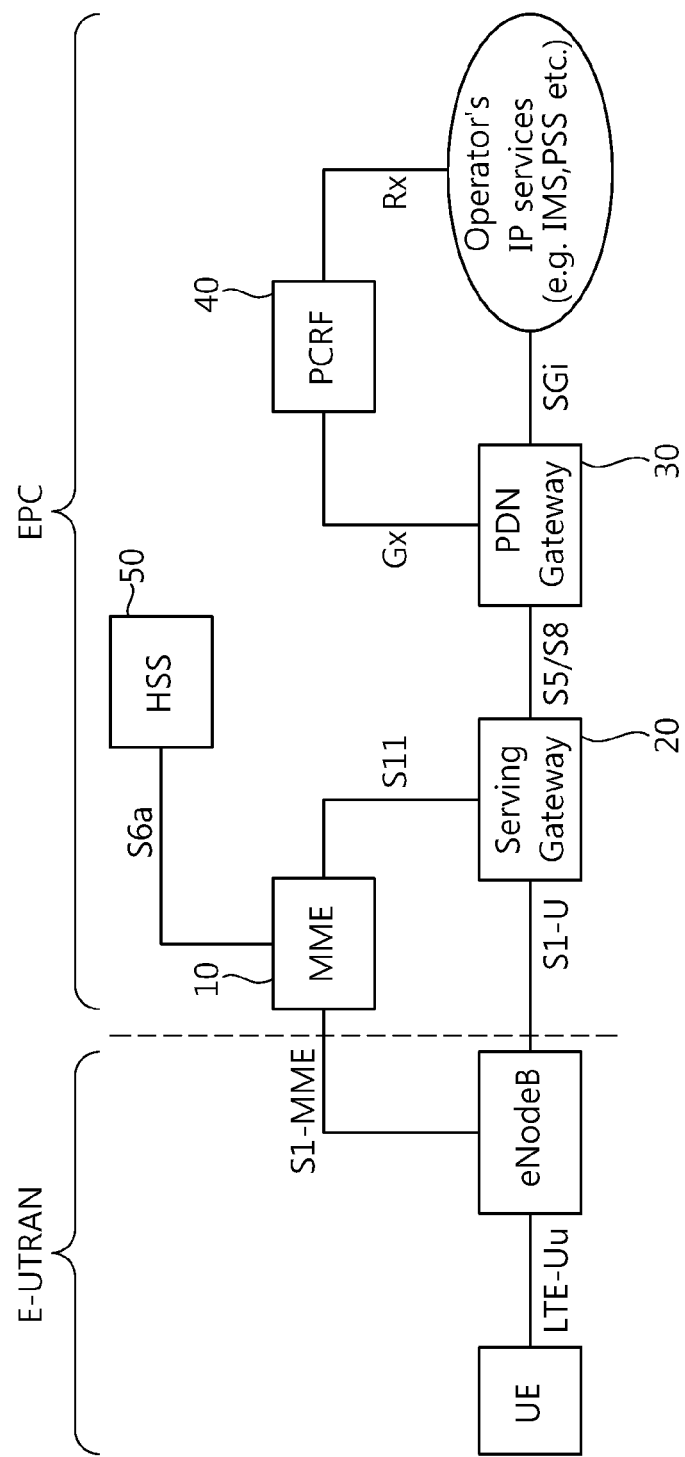
FIG. 1 is a view illustrating an Evolved Packet System which is associated with the Long Term Evolution (LTE) system.

FIG. 1 is a view illustrating an Evolved Packet System which is associated with the Long Term Evolution (LTE) system. The LTE system aims to provide seamless Internet Protocol (IP) connectivity between a user equipment (UE) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of "EPS bearers" to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers. As depicted in FIG. 1, the node (logical or physical) of the EPC in the SAE includes a Mobility Management Entity (MME) 10, a PDN gateway (PDN-GW or P-GW) 30, a Serving Gateway (S-GW) 20, a Policy and Charging Rules Function (PCRF) 40, a Home subscriber Server (HSS) 50, etc.

The MME 10 is the control node which processes the signaling between the UE and the CN. The protocols running between the UE and the CN are known as the Non-Access Stratum (NAS) protocols. Examples of functions supported by the MME 10 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 20 serves as the local mobility anchor for the data bearers when the UE moves between eNodeBs. All user IP packets are transferred through the S-GW 20. The S-GW 20 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 30 serves to perform IP address allocation for the UE, as well as QoS enforcement and flow-based charging according to rules from the PCRF 40. The P-GW 30 performs QoS enforcement for Guaranteed Bit Rate (GBR) bearers. It also serves as the mobility anchor for inter-working with non-3GPP technologies such as CDMA2000 and WiMAX networks.

The PCRF 40 serves to perform policy control decision-making, as well as for controlling the flow-based charging functionalities.

The HSS 50, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Figure 2:
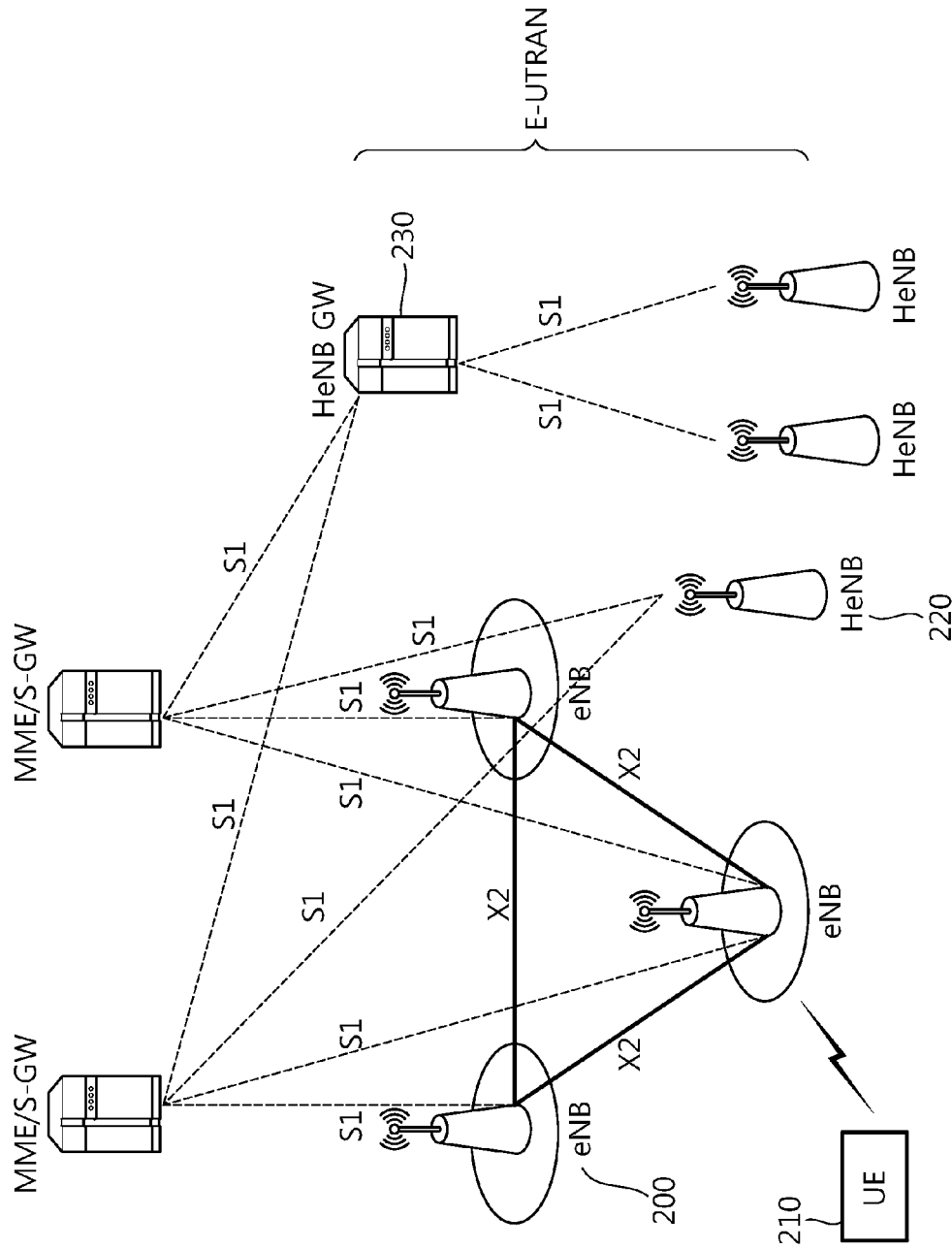
FIG. 2 is a view illustrating an overall architecture of the E-UTRAN to which the following technical features are applied.

FIG. 2 is a view illustrating an overall architecture of the E-UTRAN to which the following technical features are applied.

The E-UTRAN includes at least one eNB (evolved-Node B) 200 providing a user plane and a control plane towards a user equipment (UE) 210. The UE can be fixed or mobile and can be referred to as another terminology, such as a MS (Mobile Station), a UT (User Terminal), an SS (Subscriber Station), an MT(mobile terminal), a wireless device, or the like. The eNB 200 may be a fixed station that communicates with the UE 100 and can be referred to as another terminology, such as a base station (BS), a NB (NodeB), a BTS (Base Transceiver System), an access point, or the like.

The protocols running between the eNBs 200 and the UE 210 are known as the Access Stratum (AS) protocols.

The BSs (or eNBs) 200 are interconnected with each other by means of an X2 interface. The BSs 200 are also connected by means of the S1 interface to the aforementioned EPC (Evolved Packet Core) elements, more specifically to the Mobility Management Entity (MME) by means of the S1-MME and to the Serving Gateway (S-GW) by means of the S1-U.

The E-TURAN architecture depicted in FIG. 2 may further comprise a Home evolved Node B (HeNB) 220 and an HeNB GW (HeNB gateway) 230.

The HeNB 220 is fundamentally similar to a typical eNB, but it can be simple devices typically installed by end users themselves. The HeNB 220 is also referred to as a home NB (hNB), a Femto-cell, a home cellular base station, etc. The HeNB 220 behaves like a cellular network with respect to communication devices, which can use their regular cellular network radio interface to communicate with them, and connects to a cellular network operator's core network through the alternate network access, such as Internet access via fiber, DSL or cable subscriptions. In general, the HeNB 220 has a low radio transmission output power compared to the BS owned by mobile communication service providers. Therefore, the service coverage provided by the HeNB 220 is typically smaller than the service coverage provided by the eNB 200. Due to such characteristics, the cell provided by the HeNB 220 is classified as a Femto-cell in contrast to a macro cell provided by the eNB 200 from a standpoint of the service coverage.

Hereinafter, the concept of unlicensed band(s) will be explained.

The unlicensed bands (or license-free spectrums) are the radio spectrums that can be used by anybody without a license. Some of the most commonly used unlicensed band in the U.S. are at 900 MHz, 2.4 GHz, 5.2/5.3/5.8 GHz, 24 GHz and above 60 GHz. Other countries have varying rules about unlicensed bands. Examples of unlicensed bands include industrial, scientific and medical (ISM) bands and TVWS bands. The ISM bands are spectrums reserved internationally for the use of RF energy for industrial, scientific and medical purposes other than communications. The ISM bands are defined by the ITU-R in 5.138, 5.150, and 5.280 of the Radio Regulations. Individual countries' use of the bands designated in these sections may differ due to variations in national radio regulations. Examples of applications in the ISM bands include radio-frequency process heating, microwave ovens, and medical diathermy machines. The TVWS bands are white space band, assigned between used TV channels. Generally, the white space bands are assigned for a purpose, such as a guard band. In addition to radio bands assigned for technical reasons, there is also unused radio spectrum which has either never been used, or is becoming free as a result of technical changes. In particular, the switchover to digital television frees up large areas between about 50 MHz and 700 MHz. This occurs because digital transmissions can be packed into adjacent channels, while analog ones cannot. In the United States, full power analog television broadcasts, which had operated between the 54 MHz and 806 MHz (54-72,76-88,174-216,470-608, and 614-806 MHz) television frequencies (Channels 2-69), ceased operating in 2009, and full power TV stations were required to switch to digital transmission and operate only between 54-698 MHz. In response to this change, various proposals, including IEEE 802.11af, IEEE 802.22 and those from the White Spaces Coalition, have advocated using white spaces left by the termination of analog TV to provide wireless broadband Internet access. For example, the White Spaces Coalition proposed to deliver high speed internet access in the United States consumers via existing white space in unused television frequencies between 54-698 MHz (TV Channels 2-51). Recently, Federal Communications Commission (FCC) has determined rules for the use of white space for unlicensed wireless devices.

The following description provides a method and apparatus for communicating data based on an unlicensed band in a wireless communication system comprising the first type network entity and the second type network entity. The unlicensed band includes ISM bands and/or TVWS bands. Examples of the first type network entity includes cellular base stations, also referred to as NodeB (NB) or eNodeB (eNB) in the 3GPP specification. The cellular BS can also be node B (NB), enhanced (evolved) nodeB (eNB), access network (AN), etc. Examples of the second type network entity includes Femto-cell base stations, also referred to as Home NodeB (HNB) or eHNodeB (eHNB) in the 3GPP specification. The Femto-cell base station (BS) can also be home nodeB (HNB), home evolved (enhanced) nodeB (HeNB), etc.

A user equipment (UE) can be attached to the cellular base stations or the Femto-cell base stations. Hereinafter, UEs attached to the cellular base stations, which are not Femto-cell base stations, can be referred to as cellular UEs, and UEs attached to the Femto-cell base stations can be referred to as Femto-cell UEs.

Femto-cell BSs and UEs proposed by the following description have capabilities in operating over an unlicensed band such as ISM and TVWS bands. Femto-cell BSs are basically operating in licensed bands but they can be (or can try to search the possibility of) temporarily operating in unlicensed bands upon the ordinary BS's request and/or the Femto-cell's autonomous decision.

The method and apparatus for communicating data based on an unlicensed band in a wireless communication system proposed by the following description may be implemented after interference mitigation methods between cellular and Femto-cell networks were executed. For example, the time-frequency resources not assigned for a cellular UE may be assigned for Femto-cell operation, but not many remaining resources may be available for the Femto-cell operation.

For clarity, the method and apparatus for communicating data based on an unlicensed band proposed by the following description are explained based on a number of possible scenarios. The scenarios can be categorized into two categories, i.e., Category 1 in which interference occurs between a cellular BS (or its UE) and a Femto-cell BS (or its UE) and Category 2 in which interference occurs between a Femto-cell BS (or its UE) and another Femto-cell BS (or its UE).

Hereinafter, Category 1 is explained in detail. In Category 1, there are four possible scenarios to which the proposed method and apparatus are applied.

Figure 3:
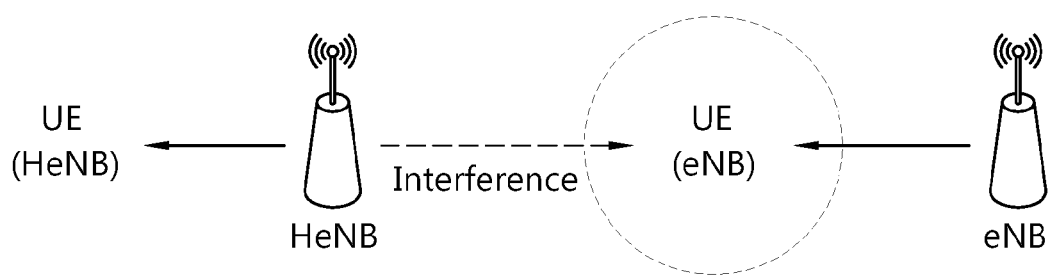
FIG. 3 is a view illustrating Scenario 1 to which the proposed method and apparatus are applied.

FIG. 3 is a view illustrating Scenario 1 to which the proposed method and apparatus are applied. The following scheme is for a UE in an RRC CONNECTED MODE, but it can be also used for a UE in an RRC IDLE MODE.

As depicted in FIG. 3, a cellular UE attached to a cellular BS (i.e., eNB) may get interfered in downlink (DL) reception. In particular, a cellular (macro or micro) UE experiences excessive interference when it receives DL transmission from the cellular BS. In Scenario 1, two possible cases can be envisioned: i) the cellular UE is located near the cell-edge, or ii) at least one Femto-cell using the same DL spectrum is located nearby.

Figure 4:
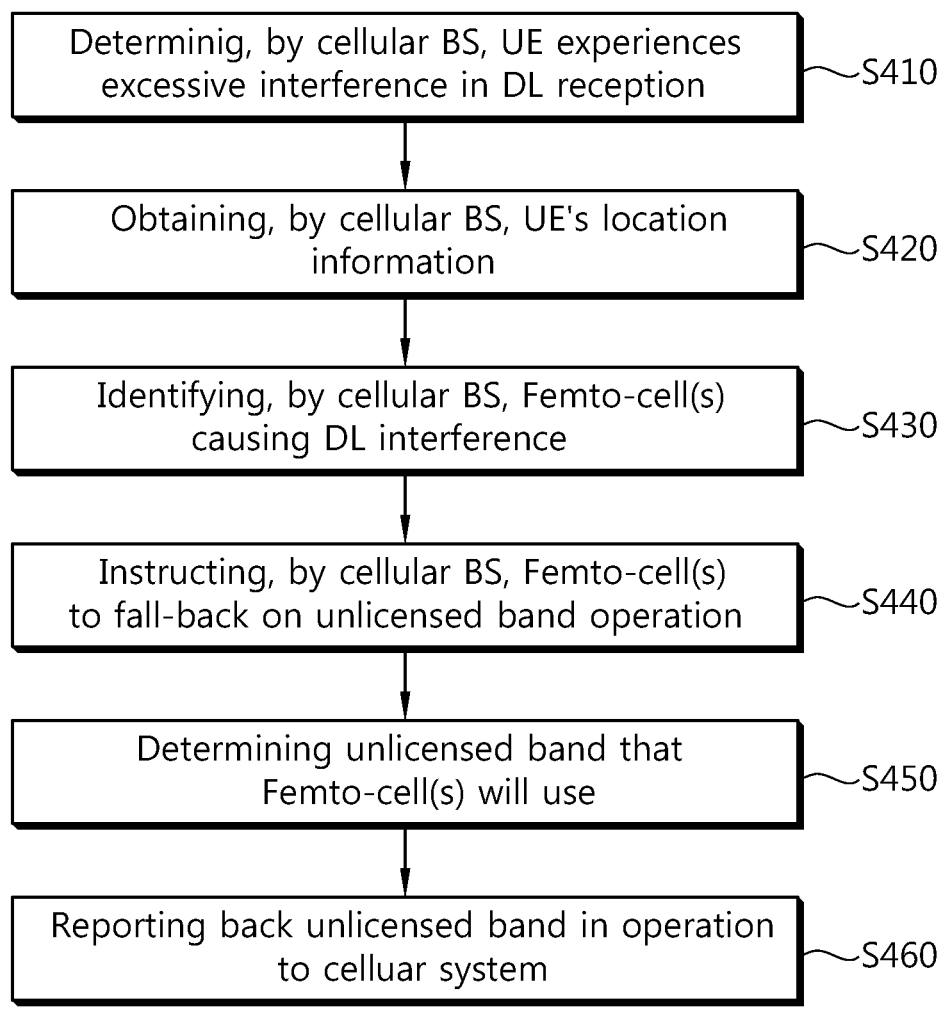
FIG. 4 is a view illustrating a method of communicating data based on an unlicensed band according to Scenario 1.

FIG. 4 is a view illustrating a method of communicating data based on an unlicensed band according to Scenario 1. When the UE experiences excessive interference in downlink (DL) reception and the UE is determined to be located not near a cell boundary or cell-edge, the cellular BS identifies at least one Femto-cell which causes the DL interference and instructs it to fall-back on unlicensed band operation. In particular, the cellular BS can determine that UE experiences excessive interference in DL reception by receiving measurement reports from the UE (S410). The cellular BS can obtain the UE's location by tracking the UE's location or by receiving location information from the UE (S420). Upon obtaining the UE's location, the cellular BS identifies the at least one Femto-cell which causes the DL interference by analyzing the location of the UE and the Femto-cell (S430). Once the Femto-cell which causes the DL interference is identified by the cellular BS, the cellular BS instructs the Femto-cell to fall-back on unlicensed band (S440). Before or after the instruction is made, the unlicensed band is determined (S450). After unlicensed band is determined, information on the determined band can be reported back to the cellular system (S460). With respect to FIG. 4, it is to be understood that the claimed subject matter is not limited by the order of the steps depicted in FIG. 4, as some steps may occur in different orders or concurrently with other steps, or be omitted, since the methodologies of FIG. 4 are shown and described for exemplary purposes only.

More detailed explanation regarding Scenario 1 is provided as follows.

In most communication systems including 3GPP LTE, the UE and eNB are configured to generate physical layer measurements of radio characteristics. Measurements are reported to the higher layers and are used for a variety of purposes including intra- and inter-frequency handover, inter-radio access technology (inter-RAT) handover, timing measurements, and other purposes. Examples of the measurements includes reference signal reception power (RSRP) and reference signal reception quality (RSRQ).

The measurements report by the UE can be periodic and/or event-triggered. For example, the UE can transmit RSRP and/or RSRQ to the eNB periodically. Alternatively, the UE can transmit the RSRP and/or RSRQ to the eNB when the RSRP and/or RSRQ falls below specific thresholds. As shown in S410, by receiving the measurements from the UE, the eNB can figure out that the UE attached to the eNB experiences excessive interference in downlink (DL) reception.

In S420, the cellular BS obtains the UE's location information. For example, the cellular UE can report its measurement results (e.g., RSRP and/or RSRQ) to the cellular BS possibly with location information. Alternatively, the cellular BS may obtain location information of the UE by tracking the UE's location. In this case, location information transmission is not required to the UE.

In S430, the cellular BS identifies Femto-cell(s) causing DL interference. In particular, if cellular UE has information on the Femto-cell(s), e.g., in the neighboring cell list, that causes incurring interference, it can include Femto-cell identity(ies) in the measurement report to the cellular base station. Alternatively, the cellular BS may refer to a network entity, which may or may not coexist with the cellular BS, to figure out the location of the Femto-cell(s) incurring interference. Detail features of S430 can be explained further as follows.

As discussed above, the cellular BS can figure out that the measurement results are below certain thresholds by receiving measurement results (e.g., RSRP and/or RSRQ) and check the location information of the cellular UE. If the UE's location is determined to be near the cell-edge, a handover is initiated by the cellular BS. In particular, if the cellular UE is in the closed subscriber group (CSG) of a Femto-cell, the current cellular BS sends a handover request message to the target cell (i.e., target Femto-cell). Otherwise, the current cellular BS sends a mobility management entity (MME) a handover required message, the MME sends a handover request message (after target cell is determined) to the target cell's serving gateway (S-GW), and the S-GW transfers the handover request message to the target cell (i.e., target cellular cell).

If the UE's location is not near the cell-edge, the cellular BS identifies Femto-cell(s) around the cellular UE. For example, the cellular BS may refer to the Femto-cell management systems (e.g., sub-function of the MME) and/or to the Femto-cell identity(ies) included in the measurement report from cellular UE.

If the Femto-cell causing interference is successfully identified, the cellular BS transmits "UnlicenseBandOperationmessage" to the MME for the identified Femto-cell to fall back on unlicensed band operation (S440). The message can be transmitted through an interface, depicted in FIGS. 1 and 2, between the cellular BS and Femto-cell BS. For example, S1-MME between cellular BS and MME, and between MME and Femto-cell GW, or S1-MME between cellular BS and MME, and between MME and Femto-cell BS in 3GPP LTE can be further used.

After or before the instruction is made, the system determines which unlicensed band(s) will be used by the Femto-cell (S450). For the Femto-cell to operate on unlicensed bands with the UE, the Femto-cell BS can be preconfigured or periodically monitor which unlicensed bands will be used when it is installed based on the RF conditions on unlicensed bands. The list of unlicensed bands can be adaptively changed as the available conditions on unlicensed bands are subject to change based on the interference. Cellular systems (i.e., BS and/or MME) can refer to the database managed by a central entity (e.g., FCC), and broadcast (e.g., through wired interface) interference status and availability on unlicensed bands. Alternatively, Femto-cell BS can request the information to the cellular systems it is subscribed to, and cellular systems (BS and/or MME) can refer to the database managed by central entity (e.g., FCC) and deliver interference status and availability on unlicensed band(s) of operation near the Femto-cell BS. Namely, the cellular system (i.e., BS and/or MME) may refer to a centralized system to obtain information on available unlicensed bands, or the Femto-cell BS may refer thereto. If the cellular or Femto-cell entities refer to centralized system (e.g., database managed by FCC), the BS and UE are not required to have capabilities related to cognitive radio, thereby reducing unnecessary use of radio resources and complexity. Once the information on available unlicensed bands is received by the Femto-cells, the Femto-cells can determine which unlicensed band(s) will be used by negotiating with the UE.

For unlicensed operation, the same or different multiple access scheme can be used. For example, FDD in cellular band operation and TDD in unlicensed band operation are possible. In a case where only TDD operation is possible (due to lack of paired band), the source cellular BS can try to check in advance, whether or not FDD operation is possible at the target Femto-cell at the moment of time.

As mentioned above, a centralized system, such as the database managed by FCC, can be used to determine unlicensed bands for the Femto-cell. However, without referring to the centralized system, a Femto-cell UE may specify the list of unlicensed band(s) that UE can support, when the Femto-cell UE registers to the Femto-cell BS. Further, unlicensed bands can be determined based on a negotiation between the Femto-cell UE and the Femto-cell BS. The range and the number of unlicensed band(s) that to Femto-cell UE can support may vary according to the class of UE.

When the unlicensed band for operation between the Femto-cell BS and the UE is determined, the Femto-cell BS instructs the UE (i.e., Femto-cell UE) to operate over the unlicensed bands. Namely, the operational band is switched from licensed bands to unlicensed bands. The switching scheme can be implemented based on an inter-carrier handover procedure.

The cellular system may not know which unlicensed bands are currently in operation, since the unlicensed bands can be exclusively determined by the Femto-cell system (i.e., Femto-cell BS and Femto-cell UE). Therefore, it is preferred that Femto-cell BS reports back which unlicensed band(s) is (are) currently in operation to the cellular system, since the cellular system can use such reports for load balancing (S460). The report can be performed by using an interface between cellular system and Femto-cell BS. For example, as depicted in FIGS. 1 and 2, the report can be delivered through S1-MME between Femto-cell BS and Femto-cell GW, and between Femto-cell GW and MME in 3GPP LTE. If information related to the report is needed in cellular BS, S1-MME between MME and cellular BS can be further used.

If interference condition is changed, the Femto-cell BS instructs the Femto-cell UE to do inter-carrier handover to another specified unlicensed band(s). For example, sudden appearance of a primary user occurs in a certain area, the Femto-cell BS may instruct a secondary user, whose priority is lower than that of the primary user, to operate over another unlicensed band(s). In other words, unlicensed band(s) may be switched to other unlicensed band(s).

As discussed above, the Femto-cell BS may report back to the cellular system for load balancing. In particular, the allocation and utilization information from multiple collocated Femto-cells can be used to distribute interference among Femto-cell BSs under unlicensed band(s) of operation.

Figure 5:
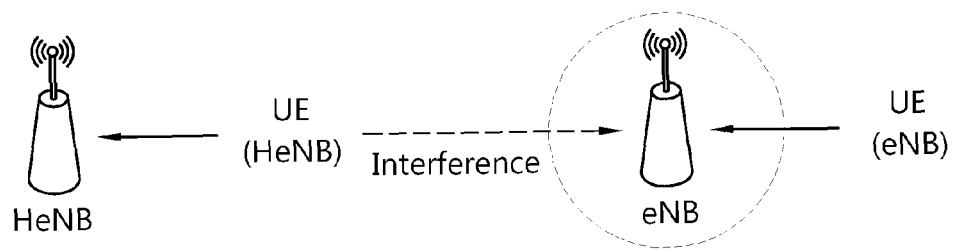
FIG. 5 is a view illustrating Scenario 2 to which the proposed method and apparatus are applied.

Hereinafter, Scenario 2 will be explained. FIG. 5 is a view illustrating Scenario 2 to which the proposed method and apparatus are applied.

As depicted in FIG. 5, a cellular BS (i.e., eNB) communicating with a cellular UE may get interfered in uplink (UL) reception. In particular, a cellular BS experiences excessive interference when it receives UL transmission from the cellular UE.

Figure 6:
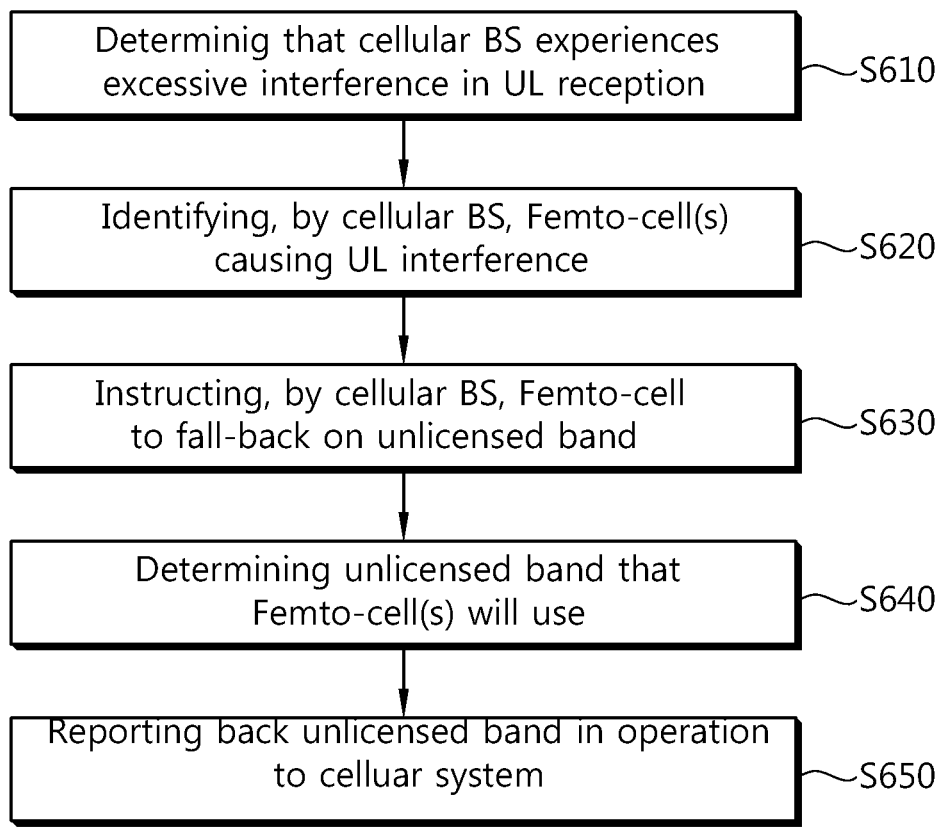
FIG. 6 is a view illustrating a method of communicating data based on an unlicensed band according to Scenario 2.

FIG. 6 is a view illustrating a method of communicating data based on an unlicensed band according to Scenario 2. When the cellular BS experiences excessive interference in uplink (UL) reception, the cellular BS identifies at least one Femto-cell which causes the UL interference and instructs it to fall-back on unlicensed band operation. In particular, the cellular BS can determine that it experiences excessive interference in UL reception (S610). The cellular BS identifies the at least one Femto-cell which causes the UL interference by analyzing the location of the UE and/or the Femto-cell (S620). Once the Femto-cell which causes the UL interference is identified by the cellular BS, the cellular BS instructs the Femto-cell to fall-back on unlicensed band operation (S630). Before or after the instruction is made, the unlicensed band is determined (S640). After unlicensed band is determined, information on such band can be reported back to the cellular system (S650). With respect to FIG. 6, it is to be understood that the claimed subject matter is not limited by the order of the steps depicted in FIG. 6, as some steps may occur in different orders or concurrently with other steps, or be omitted, since the methodologies of FIG. 6 are shown and described for exemplary purposes only.

More detailed explanation regarding Scenario 2 is provided as follows.

As shown in S610, the cellular (micro or macro) BS determines that it experiences excessive interference in uplink (UL) reception from the cellular UE. This situation can be caused by the Femto-cell BS located near the cellular BS and strong uplink transmission power from Femto-cell UE.

In S620, the cellular BS identifies Femto-cell(s) causing UL interference. In particular, if cellular UE has information on the Femto-cell(s), e.g., in the neighboring cell list, that causes incurring interference, it can include Femto-cell identity(ies) in the measurement report to the cellular base station. Alternatively, the cellular BS may refer to a network entity, which may or may not coexist with the cellular BS, to figure out the location of the Femto-cell(s) incurring interference.

If the Femto-cell causing interference is successfully identified, the cellular BS transmits "UnlicenseBandOperation-message" to the MME for the identified Femto-cell to fall back on unlicensed band operation (S630). The message can be transmitted through an interface, depicted in FIGS. 1 and 2, between the cellular BS and Femto-cell BS. For example, S1-MME between cellular BS and MME, and between MME and Femto-cell GW, or S1-MME between cellular BS and MME, and between MME and Femto-cell BS in 3GPP LTE can be further used.

After or before the instruction is made, the system determine which unlicensed band(s) will be used by the Femto-cell (S640). For the Femto-cell to operate on unlicensed bands with the UE, the Femto-cell BS can be preconfigured or periodically monitor which unlicensed bands will be used when it is installed based on the RF conditions on unlicensed bands. The list of unlicensed bands can be adaptively changed as the available conditions on unlicensed bands are subject to change based on the interference. Cellular systems (i.e., BS and/or MME) can refer to the database managed by a central entity (e.g., FCC), and broadcast (e.g., through wired interface) interference status and availability on unlicensed bands. Alternatively, Femto-cell BS can request the information to the cellular systems it is subscribed to, and cellular systems (BS and/or MME) can refer to the database managed by central entity (e.g., FCC) and deliver interference status and availability on unlicensed band(s) of operation near the Femto-cell BS. Namely, the cellular system (i.e., BS and/or MME) may refer to a centralized system to obtain information on available unlicensed bands, or the Femto-cell BS may refer thereto. If the cellular or Femto-cell entities refer to centralized system (e.g., database managed by FCC), the BS and UE are not required to have capabilities related to cognitive radio, thereby reducing unnecessary use of radio resources and complexity. Once the information on available unlicensed bands is received by the Femto-cells, the Femto-cells can determine which unlicensed band(s) will be used by negotiating with the UE.

For unlicensed operation, the same or different multiple access scheme can be used. For example, FDD in cellular band operation and TDD in unlicensed band operation are possible. In a case where only TDD operation is possible (due to lack of paired band), the source cellular BS can try to check in advance, whether or not FDD operation is possible at the target Femto-cell at the moment of time.

As mentioned above, a centralized system, such as the database managed by FCC, can be used to determine unlicensed bands for the Femto-cell. However, without referring to the centralized system, a Femto-cell UE may specify the list of unlicensed band(s) that UE can support, when the Femto-cell UE registers to the Femto-cell BS. Further, unlicensed bands can be determined based on a negotiation between the Femto-cell UE and the Femto-cell BS. The range and the number of unlicensed band(s) that Femto-cell UE can support may vary according to the class of UE.

When the unlicensed band for operation between the Femto-cell BS and the UE is determined, the Femto-cell BS instructs the UE (i.e., Femto-cell UE) to operate over the unlicensed bands. Namely, the operational band is switched from licensed bands to unlicensed bands. The switching scheme can be implemented based on an inter-carrier handover procedure.

The cellular system may not know which unlicensed bands are currently in operation, since the unlicensed bands can be exclusively determined by the Femto-cell system (i.e., Femto-cell BS and Femto-cell UE). Therefore, it is preferred that Femto-cell BS reports back which unlicensed band(s) is (are) currently in operation to the cellular system, since the cellular system can use such reports for load balancing (S650). The report can be performed by using an interface between cellular system and Femto-cell BS. For example, as depicted in FIGS. 1 and 2, the report can be delivered through S1-MME between Femto-cell BS and Femto-cell GW, and between Femto-cell GW and MME in 3GPP LTE. If information related to the report is needed in cellular BS, S1-MME between MME and cellular BS can be further used.

If interference condition is changed, the Femto-cell BS instructs the Femto-cell UE to do inter-carrier handover to another specified unlicensed band(s). For example, sudden appearance of a primary user occurs in a certain area, the Femto-cell BS may instruct a secondary user, whose priority is lower than that of the primary user, to operate over another unlicensed band(s). In other words, unlicensed band(s) may be switched to other unlicensed band(s).

As discussed above, the Femto-cell BS may report back to the cellular system for load balancing. In particular, the allocation and utilization information from multiple collocated Femto-cells can be used to distribute interference among Femto-cell BSs under unlicensed band(s) of operation.

Even in Scenario 2, the cellular BS may obtain the UE's location information. For example, cellular UE can report its measurement results (e.g., RSRP and/or RSRQ) to the cellular BS possibly with location information. Alternatively, the cellular BS may obtain location information of the UE by tracking the UE's location. In this case, location information transmission is not required to the UE.

Figure 7:
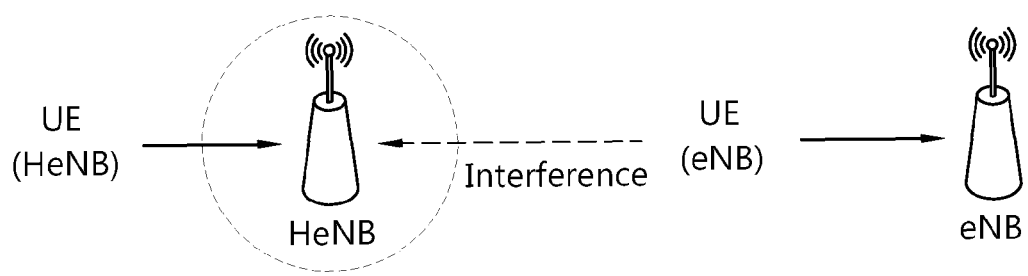
FIG. 7 is a view illustrating Scenario 3 to which the proposed method and apparatus are applied.

Hereinafter, Scenario 3 will be explained. FIG. 7 is a view illustrating Scenario 3 to which the proposed method and apparatus are applied.

As depicted in FIG. 7, a Femto-cell BS (i.e., HeNB) communicating with a Femto-cell UE may get interfered in uplink (UL) reception. In particular, the Femto-cell BS experiences excessive interference when it receives UL transmission from the Femto-cell UE.

Figure 8:
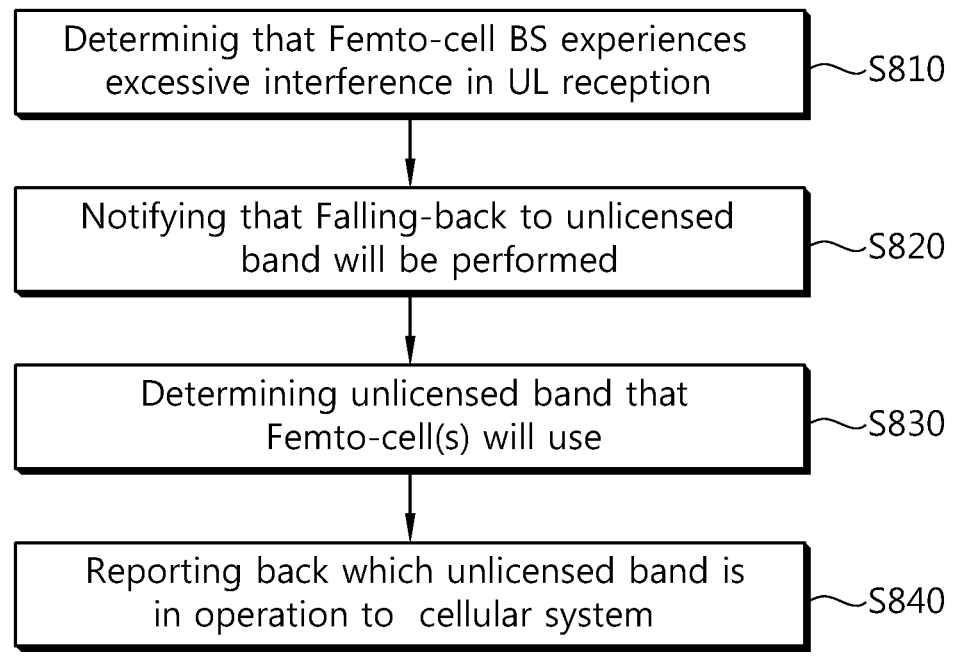
FIG. 8 is a view illustrating a method of communicating data based on an unlicensed band according to Scenario 3.

FIG. 8 is a view illustrating a method of communicating data based on an unlicensed band according to Scenario 3. The Femto-cell BS may experience excessive interference in uplink (UL) reception when a cellular UE is located near the Femto-BS (S810). In response to the occurrence of the interference, the Femto-cell BS notifies the cellular system that it will fall-back to unlicensed band operation (S820). Before or after the notification is made, the unlicensed band is determined (S830). After unlicensed band is determined, information on such band can be reported back to the cellular system (S840). With respect to FIG. 8, it is to be understood that the claimed subject matter is not limited by the order of the steps depicted in FIG. 8, as some steps may occur in different orders or concurrently with other steps, or be omitted, since the methodologies of FIG. 8 are shown and described for exemplary purposes only.

More detailed explanation regarding Scenario 3 is provided as follows.

As shown in S810, the Femto-cell BS determines that it experiences excessive interference in uplink (UL) reception from the Femto-cell UE. This situation can be caused by the cellular BS located near the Femto-cell BS and strong uplink transmission power from the cellular UE.

Once the excessive interference is found in UL reception, the Femto-cell BS notifies the cellular system that it will fall-back to unlicensed band operation. Fall-back to unlicensed band operation can be a permission-based mode or an autonomous mode (S820). In the permission-based mode, fall-back operation is allowed after getting a permission from the cellular system. In the autonomous mode, Femto-cell BS informs cellular system that it will fall-back to unlicensed band operation with certain spectrum band(s).

After or before the notification is made, the system determine which unlicensed band(s) will be used by the Femto-cell (S830). For the Femto-cell to operate on unlicensed bands with the UE, the Femto-cell BS can be preconfigured or periodically monitor which unlicensed bands will be used when it is installed based on the RF conditions on unlicensed bands. The list of unlicensed bands can be adaptively changed as the available conditions on unlicensed bands are subject to change based on the interference. Cellular systems (i.e., BS and/or MME) can refer to the database managed by a central entity (e.g., FCC), and broadcast (e.g., through wired interface) interference status and availability on unlicensed bands. Alternatively, Femto-cell BS can request the information to the cellular systems it is subscribed to, and cellular systems (BS and/or MME) can refer to the database managed by central entity (e.g., FCC) and deliver interference status and availability on unlicensed band(s) of operation near the Femto-cell BS. Namely, the cellular system (i.e., BS and/or MME) may refer to a centralized system to obtain information on available unlicensed bands, or the Femto-cell BS may refer thereto. If the cellular or Femto-cell entities refer to centralized system (e.g., database managed by FCC), the BS and UE are not required to have capabilities related to cognitive radio, thereby reducing unnecessary use of radio resources and complexity. Once the information on available unlicensed bands is received by the Femto-cells, the Femto-cells can determine which unlicensed band(s) will be used by negotiating with the UE.

For unlicensed operation, the same or different multiple access scheme can be used. For example, FDD in cellular band operation and TDD in unlicensed band operation are possible. In a case where only TDD operation is possible (due to lack of paired band), the source cellular BS can try to check in advance, whether or not FDD operation is possible at the target Femto-cell at the moment of time.

As mentioned above, a centralized system, such as the database managed by FCC, can be used to determine unlicensed bands for the Femto-cell. However, without referring to the centralized system, a Femto-cell UE may specify the list of unlicensed band(s) that UE can support, when the Femto-cell UE registers to the Femto-cell BS. Further, unlicensed bands can be determined based on a negotiation between the Femto-cell UE and the Femto-cell BS. The range and the number of unlicensed band(s) that Femto-cell UE can support may vary according to the class of UE.

When the unlicensed band for operation between the Femto-cell BS and the UE is determined, the Femto-cell BS instructs the UE (i.e., Femto-cell UE) to operate over the unlicensed bands. Namely, the operational band is switched from licensed bands to unlicensed bands. The switching scheme can be implemented based on an inter-carrier handover procedure.

The cellular system may not know which unlicensed bands are currently in operation, since the unlicensed bands can be exclusively determined by the Femto-cell system (i.e., Femto-cell BS and Femto-cell UE). Therefore, it is preferred that Femto-cell BS reports back which unlicensed band(s) is (are) currently in operation to the cellular system, since the cellular system can use such reports for load balancing (S840). The report can be performed by using an interface between cellular system and Femto-cell BS. For example, as depicted in FIGS. 1 and 2, the report can be delivered through S1-MME between Femto-cell BS and Femto-cell GW, and between Femto-cell GW and MME in 3GPP LTE. If information related to the report is needed in cellular BS, S1-MME between MME and cellular BS can be further used.

If interference condition is changed, the Femto-cell BS instructs the Femto-cell UE to do inter-carrier handover to another specified unlicensed band(s). For example, sudden appearance of a primary user occurs in a certain area, the Femto-cell BS may instruct a secondary user, whose priority is lower than that of the primary user, to operate over another unlicensed band(s). In other words, unlicensed band(s) may be switched to other unlicensed band(s).

As discussed above, the Femto-cell BS may report back to the cellular system for load balancing. In particular, the allocation and utilization information from multiple collocated Femto-cells can be used to distribute interference among Femto-cell BSs under unlicensed band(s) of operation.

Even in Scenario 3, the cellular BS may obtain the UE's location information. For example, cellular UE can report its measurement results (e.g., RSRP and/or RSRQ) to the cellular BS possibly with location information. Alternatively, the cellular BS may obtain location information of the UE by tracking the UE's location. In this case, location information transmission is not required to the UE.

Figure 9:
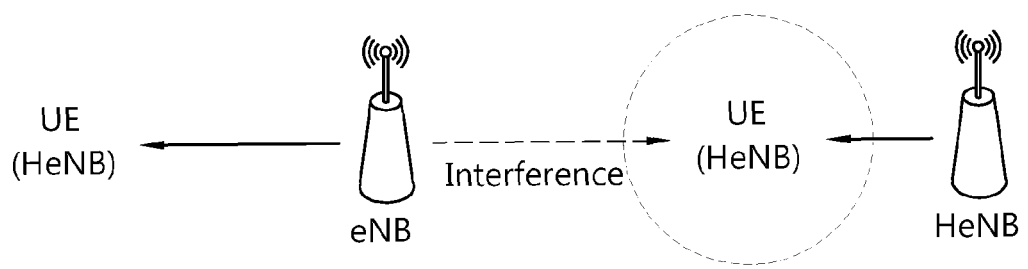
FIG. 9 is a view illustrating Scenario 4 to which the proposed method and apparatus are applied.

Hereinafter, Scenario 4 will be explained. FIG. 9 is a view illustrating Scenario 4 to which the proposed method and apparatus are applied.

As depicted in FIG. 9, a Femto-cell UE communicating with a Femto-cell BS (i.e., HeNB) may get interfered in DL reception. In particular, the Femto-cell UE experiences excessive interference when it receives DL transmission from the Femto-cell BS.

Figure 10:
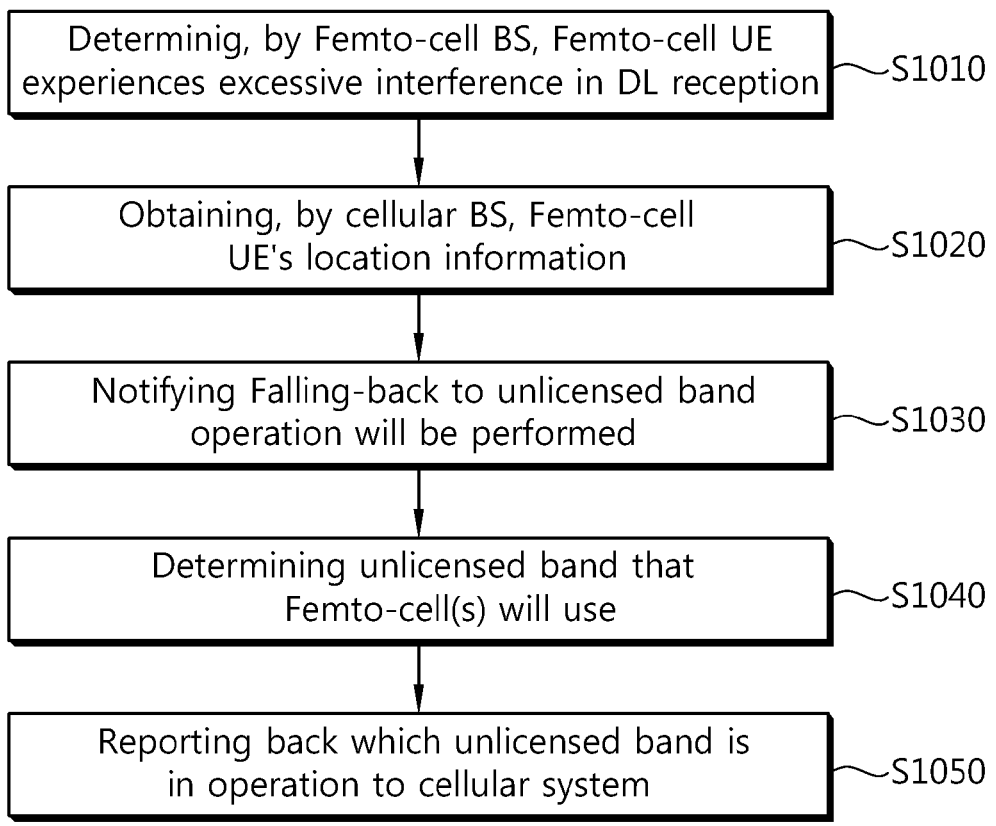
FIG. 10 is a view illustrating a method of communicating data based on an unlicensed band according to Scenario 4.

FIG. 10 is a view illustrating a method of communicating data based on an unlicensed band according to Scenario 4. The Femto-cell BS may experience excessive interference in uplink (UL) reception when a cellular UE is located near the Femto-BS (S1010). The Femto-cell BS can obtain the Femto-cell UE's location (S1020). In response to the occurrence of the interference, the Femto-cell BS notifies the cellular system that it will fall-back to unlicensed band operation (S1030). Before or after the notification is made, the unlicensed band is determined (S1040). After unlicensed band is determined, information on such band can be reported back to the cellular system (S1050). With respect to FIG. 10, it is to be understood that the claimed subject matter is not limited by the order of the steps depicted in FIG. 10, as some steps may occur in different orders or concurrently with other steps, or be omitted, since the methodologies of FIG. 10 are shown and described for exemplary purposes only.

More detailed explanation regarding Scenario 4 is provided as follows.

As shown in S1010, whether the Femto-cell UE experiences excessive interference in DL reception from the Femto-cell BS is determined. Such determination can be performed by the Femto-cell BS. For example, by receiving the measurements (e.g., RSRP and/or RSRQ) from the UE, the Femto-cell BS can figure out that the Femto-cell UE attached to the Femto-cell BS experiences excessive interference in downlink (DL) reception. The inference in DL reception can be caused when the cellular UE using the same DL spectrum is located nearby, and the Femto-cell UE is near Femto-cell/cellular boundary region.

In S1020, the Femto-cell BS obtains the Femto-cell UE's location information. For example, the Femto-cell UE can report its measurement results (e.g., RSRP and/or RSRQ) to the Femto-cell BS possibly with location information. Alternatively, the Femto-cell BS may obtain location information by tracking the Femto-cell UE's location In S1030, the Femto-cell BS notifies the cellular system that it will fall-back to unlicensed band operation. In particular, if it is determined that the Femto-cell UE is located near a Femto-cell/cellular boundary region, a handover from Femto-cell to cellular handover is initiated. In this case, the fall-back to unlicensed band operation is not perform. However, if it is determined that the Femto-cell UE is not near the Femto-cell/cellular boundary region, the Femto-cell BS notifies the cellular system that it will fall-back to unlicensed band operation. Fall-back to unlicensed band operation can be a permission-based mode or an autonomous mode. In the permission-based mode, fall-back operation is allowed after getting a permission from the cellular system. In the autonomous mode, Femto-cell BS informs cellular system that it will fall-back to unlicensed band operation with certain spectrum band(s).

After or before the notification is made, the system determine which unlicensed band(s) will be used by the Femto-cell (S1040). For the Femto-cell to operate on unlicensed bands with the UE, the Femto-cell BS can be preconfigured or periodically monitor which unlicensed bands will be used when it is installed based on the RF conditions on unlicensed bands. The list of unlicensed bands can be adaptively changed as the available conditions on unlicensed bands are subject to change based on the interference. Cellular systems (i.e., BS and/or MME) can refer to the database managed by a central entity (e.g., FCC), and broadcast (e.g., through wired interface) interference status and availability on unlicensed bands. Alternatively, Femto-cell BS can request the information to the cellular systems it is subscribed to, and cellular systems (BS and/or MME) can refer to the database managed by central entity (e.g., FCC) and deliver interference status and availability on unlicensed band(s) of operation near the Femto-cell BS. Namely, the cellular system (i.e., BS and/or MME) may refer to a centralized system to obtain information on available unlicensed bands, or the Femto-cell BS may refer thereto. If the cellular or Femto-cell entities refer to centralized system (e.g., database managed by FCC), the BS and UE are not required to have capabilities related to cognitive radio, thereby reducing unnecessary use of radio resources. Once the information on available unlicensed bands is received by the Femto-cells, the Femto-cells can determine which unlicensed band(s) will be used by negotiating with the UE.

For unlicensed operation, the same or different multiple access scheme can be used. For example, FDD in cellular band operation and TDD in unlicensed band operation are possible. In a case where only TDD operation is possible (due to lack of paired band), the source cellular BS can try to check in advance, whether or not FDD operation is possible at the target Femto-cell at the moment of time.

As mentioned above, a centralized system, such as the database managed by FCC, can be used to determine unlicensed bands for the Femto-cell. However, without referring to the centralized system, a Femto-cell UE may specify the list of unlicensed band(s) that UE can support, when the Femto-cell UE registers to the Femto-cell BS. Further, unlicensed bands can be determined based on a negotiation between the Femto-cell UE and the Femto-cell BS. The range and the number of unlicensed band(s) that Femto-cell UE can support may vary according to the class of UE.

When the unlicensed band for operation between the Femto-cell BS and the UE is determined, the Femto-cell BS instructs the UE (i.e., Femto-cell UE) to operate over the unlicensed bands. Namely, the operational band is switched from licensed bands to unlicensed bands. The switching scheme can be implemented based on an inter-carrier handover procedure.

The cellular system may not know which unlicensed bands are currently in operation, since the unlicensed bands can be exclusively determined by the Femto-cell system (i.e., Femto-cell BS and Femto-cell UE). Therefore, it is preferred that Femto-cell BS reports back which unlicensed band(s) is (are) currently in operation to the cellular system, since the cellular system can use such reports for load balancing (S1050). The report can be performed by using an interface between cellular system and Femto-cell BS. For example, as depicted in FIGS. 1 and 2, the report can be delivered through S1-MME between Femto-cell BS and Femto-cell GW, and between Femto-cell GW and MME in 3GPP LTE. If information related to the report is needed in cellular BS, S1-MME between MME and cellular BS can be further used.

If interference condition is changed, the Femto-cell BS instructs the Femto-cell UE to do inter-carrier handover to another specified unlicensed band(s). For example, sudden appearance of a primary user occurs in a certain area, the Femto-cell BS may instruct a secondary user, whose priority is lower than that of the primary user, to operate over another unlicensed band(s). In other words, unlicensed band(s) may be switched to other unlicensed band(s).

As discussed above, the Femto-cell BS may report back to the cellular system for load balancing. In particular, the allocation and utilization information from multiple collocated Femto-cells can be used to distribute interference among Femto-cell BSs under unlicensed band(s) of operation.

Even in Scenario 4, the cellular BS may obtain the UE's location information. For example, cellular UE can report its measurement results (e.g., RSRP and/or RSRQ) to the cellular BS possibly with location information. Alternatively, the cellular BS may obtain location information of the UE by tracking the UE's location. In this case, location information transmission is not required to the UE.

Hereinafter, Category 2 is explained in detail. In Category 2, there are two possible scenarios (Scenarios 5 and 6) to which the proposed method and apparatus are applied.

Figure 11:
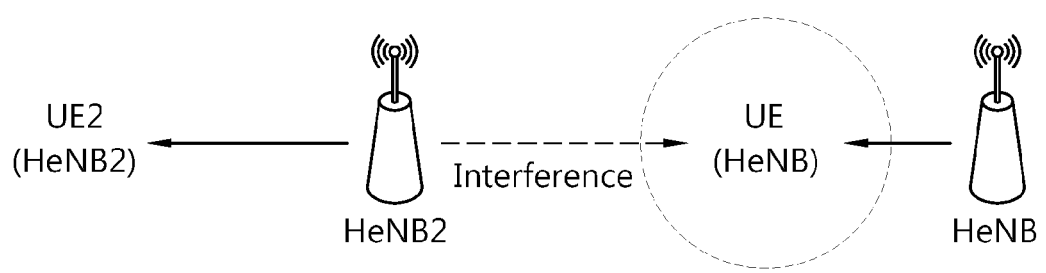
FIG. 11 is a view illustrating Scenario 5 to which the proposed method and apparatus are applied.

Hereinafter, Scenario 5 will be explained. FIG. 11 is a view illustrating Scenario 5 to which the proposed method and apparatus are applied.

As depicted in FIG. 11, a Femto-cell UE communicating with a Femto-cell BS (i.e., HeNB) may get interfered in DL reception. In particular, the Femto-cell UE experiences excessive interference when it receives DL transmission from the Femto-cell BS.

Figure 12:
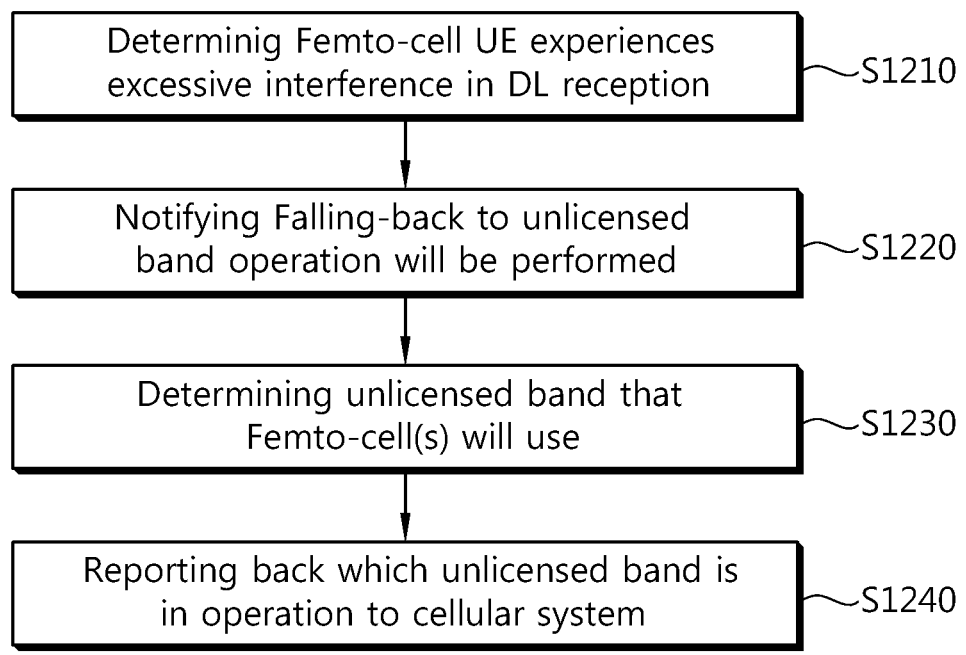
FIG. 12 is a view illustrating a method of communicating data based on an unlicensed band according to Scenario 5.

FIG. 12 is a view illustrating a method of communicating data based on an unlicensed band according to Scenario 5.

The Femto-cell UE may experience excessive interference in DL reception when the Femto-cell UE is located near the edge (S1210). In response to the occurrence of the interference, the Femto-cell BS notifies the Femto-cell GW or MME system that it will fall-back to unlicensed band operation (S1220). Before or after the notification is made, the unlicensed band is determined (S1230). After unlicensed band is determined, information on such band can be reported back to the cellular system (S1240). With respect to FIG. 12, it is to be understood that the claimed subject matter is not limited by the order of the steps depicted in FIG. 12, as some steps may occur in different orders or concurrently with other steps, or be omitted, since the methodologies of FIG. 12 are shown and described for exemplary purposes only.

More detailed explanation regarding Scenario 5 is provided as follows.

As shown in S1210, the Femto-cell UE determines that it experiences excessive interference in DL reception from the Femto-cell BS. This situation can be caused by the Femto-cell located near the edge of the Femto-cell and other Femto-cell UE using the same DL spectrum which is located nearby.

Once the excessive interference is found in DL reception, Femto-cell UE reports its measurement results (RSRP and/or RSRQ) to the Femto-cell BS, and Femto-cell BS delivers this information to Femto-cell GW or MME with its intention to fall-back to unlicensed band operation (S1220). Fall-back to unlicensed band operation can be a permission-based mode or an autonomous mode. In the permission-based mode, fall-back operation is allowed after getting a permission from the Femto-cell GW or MME. The Femto-cell GW or MME may instruct the Femto-cell BS to stay in cellular band operation in a case where other Femto-cell BS is instructed to fall-back to unlicensed band operation, or may instruct to fall-back to unlicensed band operation in a case where either other Femto-cell BS is instructed to stay in cellular band operation or is instructed to fall-back to unlicensed band operation with different unlicensed band spectrum assignment. In the autonomous mode, Femto-cell BS informs Femto-cell GW or MME that it will fall-back to unlicensed band operation with certain spectrum band(s).

After or before the notification is made, the system determine which unlicensed band(s) will be used by the Femto-cell (S1230). For the Femto-cell to operate on unlicensed bands with the UE, the Femto-cell BS can be preconfigured or periodically monitor which unlicensed bands will be used when it is installed based on the RF conditions on unlicensed bands. The list of unlicensed bands can be adaptively changed as the available conditions on unlicensed bands are subject to change based on the interference. Cellular systems (i.e., BS and/or MME) can refer to the database managed by a central entity (e.g., FCC), and broadcast (e.g., through wired interface) interference status and availability on unlicensed bands. Alternatively, Femto-cell BS and/or Femto-cell GW can request the information to the cellular systems it is subscribed to, and cellular systems (BS and/or MME) can refer to the database managed by central entity (e.g., FCC) and deliver interference status and availability on unlicensed band(s) of operation near the Femto-cell BS. Namely, the cellular system (i.e., BS and/or MME) may refer to a centralized system to obtain information on available unlicensed bands, or the Femto-cell BS may refer thereto. If the cellular or Femto-cell entities refer to centralized system (e.g., database managed by FCC), the BS and UE are not required to have capabilities related to cognitive radio, thereby reducing unnecessary use of radio resources. Once the information on available unlicensed bands is received by the Femto-cells, the Femto-cells can determine which unlicensed band(s) will be used by negotiating with the UE.

For unlicensed operation, the same or different multiple access scheme can be to used. For example, FDD in cellular band operation and TDD in unlicensed band operation are possible. In a case where only TDD operation is possible (due to lack of paired band), the source cellular BS can try to check in advance, whether or not FDD operation is possible at the target Femto-cell at the moment of time.

As mentioned above, a centralized system, such as the database managed by FCC, can be used to determine unlicensed bands for the Femto-cell. However, without referring to the centralized system, a Femto-cell UE may specify the list of unlicensed band(s) that UE can support, when the Femto-cell UE registers to the Femto-cell BS. Further, unlicensed bands can be determined based on a negotiation between the Femto-cell UE and the Femto-cell BS. The range and the number of unlicensed band(s) that Femto-cell UE can support may vary according to the class of UE.

When the unlicensed band for operation between the Femto-cell BS and the UE is determined, the Femto-cell BS instructs the UE (i.e., Femto-cell UE) to operate over the unlicensed bands. Namely, the operational band is switched from licensed bands to unlicensed bands. The switching scheme can be implemented based on an inter-carrier handover procedure. Alternatively, the Femto-cell BS instructs the Femto-cell UE to stay in cellular band operation and further instructs other Femto-cell BS to fall back to unlicensed band operation.

The cellular system may not know which unlicensed bands are currently in operation, since the unlicensed bands can be exclusively determined by the Femto-cell system (i.e., Femto-cell BS and Femto-cell UE). Therefore, it is preferred that Femto-cell BS reports back which unlicensed band(s) is (are) currently in operation to the cellular system, since the cellular system can use such reports for load balancing (S1240). The report can be performed by using an interface between cellular system and Femto-cell BS. For example, as depicted in FIGS. 1 and 2, the report can be delivered through S1-MME between Femto-cell BS and Femto-cell GW, and between Femto-cell GW and MME in 3GPP LTE. If information related to the report is needed in cellular BS, S1-MME between MME and cellular BS can be further used.

If interference condition is changed, the Femto-cell BS instructs the Femto-cell UE to do inter-carrier handover to another specified unlicensed band(s). For example, sudden appearance of a primary user occurs in a certain area, the Femto-cell BS may instruct a secondary user, whose priority is lower than that of the primary user, to operate over another unlicensed band(s). In other words, unlicensed band(s) may be switched to other unlicensed band(s).

As discussed above, the Femto-cell BS may report back to the cellular system for load balancing. In particular, the allocation and utilization information from multiple collocated Femto-cells can be used to distribute interference among Femto-cell BSs under unlicensed band(s) of operation.

Even in Scenario 5, the cellular BS and Femto-cell BS may obtain the UE's location information. For example, cellular UE can report its measurement results (e.g., RSRP and/or RSRQ) possibly with location information. Alternatively, the BS may obtain location information of the UE by tracking the UE's location. In this case, location information transmission is not required to the UE.

Figure 13:
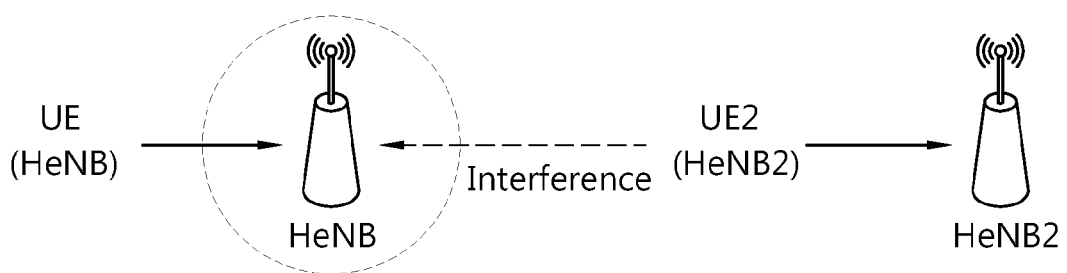
FIG. 13 is a view illustrating Scenario 6 to which the proposed method and apparatus are applied.

Hereinafter, Scenario 6 will be explained. FIG. 13 is a view illustrating Scenario 6 to which the proposed method and apparatus are applied.

As depicted in FIG. 13, a Femto-cell BS (i.e., HeNB) communicating with a
Femto-cell UE may get interfered in UL reception. In particular, the Femto-cell BS experiences excessive interference when it receives UL transmission from the Femto-cell UE.

Figure 14:
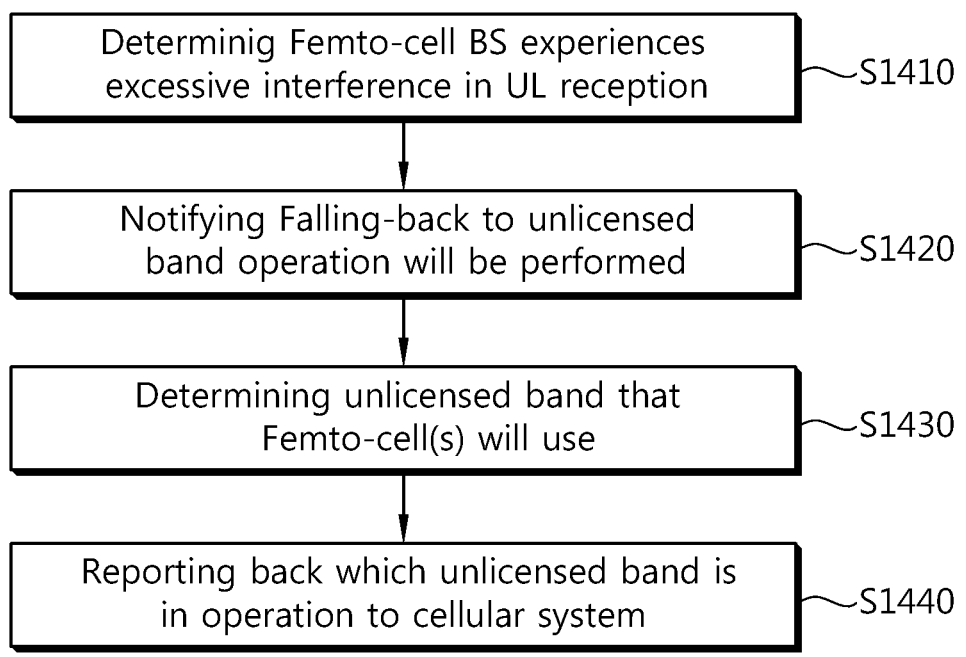
FIG. 14 is a view illustrating a method of communicating data based on an unlicensed band according to Scenario 6.

FIG. 14 is a view illustrating a method of communicating data based on an unlicensed band according to Scenario 6. The Femto-cell BS may experience excessive interference in UL reception when the Femto-cell UE is located nearby (S1410). In response to the occurrence of the interference, the Femto-cell BS notifies the Femto-cell GW or MME system that it will fall-back to unlicensed band operation (S1420). Before or after the notification is made, the unlicensed band is determined (S1430). After unlicensed band is determined, information on such band can be reported back to the cellular system (S1440). With respect to FIG. 14, it is to be understood that the claimed subject matter is not limited by the order of the steps depicted in FIG. 14, as some steps may occur in different orders or concurrently with other steps, or be omitted, since the methodologies of FIG. 14 are shown and described for exemplary purposes only.

More detailed explanation regarding Scenario 6 is provided as follows.

As shown in S1410, the Femto-cell BS determines that it experiences excessive interference in UL reception from the Femto-cell UE. This situation can be caused by other Femto-cell UE using the same DL spectrum which is located nearby.

Once the excessive interference is found in DL reception, Femto-cell BS reports its measurement results (RSRP and/or RSRQ) to the Femto-cell GW or MME, and Femto-cell BS delivers this information to Femto-cell GW or MME with its intention to fall-back to unlicensed band operation (S1420). Fall-back to unlicensed band operation can be a permission-based mode or an autonomous mode. In the permission-based mode, fall-back operation is allowed after getting a permission from the Femto-cell GW or MME. The Femto-cell GW or MME may instruct the Femto-cell BS to stay in cellular band operation in a case where other Femto-cell BS is instructed to fall-back to unlicensed band operation, or may instruct to fall-back to unlicensed band operation as in a case where either other Femto-cell BS is instructed to stay in cellular band operation or is instructed to fall-back to unlicensed band operation with different unlicensed band spectrum assignment. In the autonomous mode, Femto-cell BS informs Femto-cell GW or MME that it will fall-back to unlicensed band operation with certain spectrum band(s).

After or before the notification is made, the system determine which unlicensed band(s) will be used by the Femto-cell (S1430). For the Femto-cell to operate on unlicensed bands with the UE, the Femto-cell BS can be preconfigured or periodically monitor which unlicensed bands will be used when it is installed based on the RF conditions on unlicensed bands. The list of unlicensed bands can be adaptively changed as the available conditions on unlicensed bands are subject to change based on the interference. Cellular systems (i.e., BS and/or MME) can refer to the database managed by a central entity (e.g., FCC), and broadcast (e.g., through wired interface) interference status and availability on unlicensed bands. Alternatively, Femto-cell BS and/or Femto-cell GW can request the information to the cellular systems it is subscribed to, and cellular systems (BS and/or MME) can refer to the database managed by central entity (e.g., FCC) and deliver interference status and availability on unlicensed band(s) of operation near the Femto-cell BS. Namely, the cellular system (i.e., BS and/or MME) may refer to a centralized system to obtain information on available unlicensed bands, or the Femto-cell BS may refer thereto. If the cellular or Femto-cell entities refer to centralized system (e.g., database managed by FCC), the BS and UE are not required to have capabilities related to cognitive radio, thereby reducing unnecessary use of radio resources. Once the information on available unlicensed bands is received by the Femto-cells, the Femto-cells can determine which unlicensed band(s) will be used by negotiating with the UE.

For unlicensed operation, the same or different multiple access scheme can be used. For example, FDD in cellular band operation and TDD in unlicensed band operation are possible. In a case where only TDD operation is possible (due to lack of paired band), the source cellular BS can try to check in advance, whether or not FDD operation is possible at the target Femto-cell at the moment of time.

As mentioned above, a centralized system, such as the database managed by FCC, can be used to determine unlicensed bands for the Femto-cell. However, without referring to the centralized system, a Femto-cell UE may specify the list of unlicensed band(s) that UE can support, when the Femto-cell UE registers to the Femto-cell BS. Further, unlicensed bands can be determined based on a negotiation between the Femto-cell UE and the Femto-cell BS. The range and the number of unlicensed band(s) that Femto-cell UE can support may vary according to the class of UE.

When the unlicensed band for operation between the Femto-cell BS and the UE is determined, the Femto-cell BS instructs the UE (i.e., Femto-cell UE) to operate over the unlicensed bands. Namely, the operational band is switched from licensed bands to unlicensed bands. The switching scheme can be implemented based on an inter-carrier handover procedure. Alternatively, the Femto-cell BS instructs the Femto-cell UE to stay in cellular band operation and further instructs other Femto-cell BS to fall back to unlicensed band operation.

The cellular system may not know which unlicensed bands are currently in operation, since the unlicensed bands can be exclusively determined by the Femto-cell system (e.g., Femto-cell BS). Therefore, it is preferred that Femto-cell BS reports back which unlicensed band(s) is (are) currently in operation to the cellular system, since the cellular system can use such reports for load balancing (S1440). The report can be performed by using an interface between cellular system and Femto-cell BS. For example, as depicted in FIGS. 1 and 2, the report can be delivered through S1-MME between Femto-cell BS and Femto-cell GW, and between Femto-cell GW and MME in 3GPP LTE. If information related to the report is needed in cellular BS, S1-MME between MME and cellular BS can be further used.

If interference condition is changed, the Femto-cell BS instructs the Femto-cell UE to do inter-carrier handover to another specified unlicensed band(s). For example, sudden appearance of a primary user occurs in a certain area, the Femto-cell BS may instruct a secondary user, whose priority is lower than that of the primary user, to operate over another unlicensed band(s). In other words, unlicensed band(s) may be switched to other unlicensed band(s).

As discussed above, the Femto-cell BS may report back to the cellular system for load balancing. In particular, the allocation and utilization information from multiple collocated Femto-cells can be used to distribute interference among Femto-cell BSs under unlicensed band(s) of operation.

Even in Scenario 6, the cellular BS and Femto-cell BS may obtain the UE's location information. For example, cellular UE can report its measurement results (e.g., RSRP and/or RSRQ) possibly with location information. Alternatively, the BS may obtain location information of the UE by tracking the UE's location. In this case, location information transmission is not required to the UE.

Figure 15:
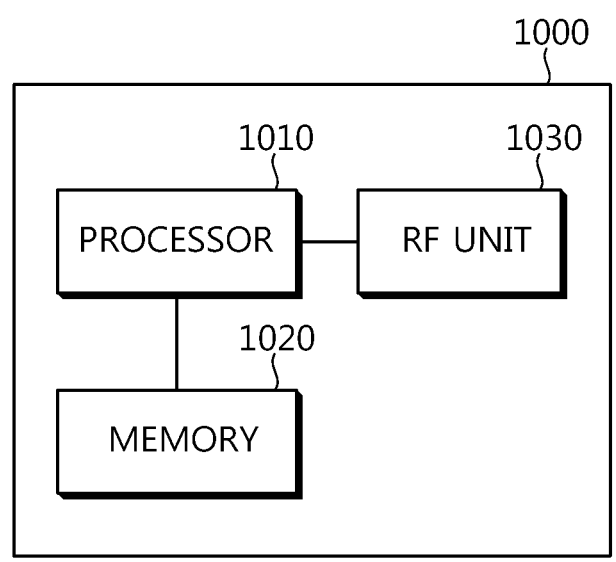
FIG. 15 is a block diagram showing a wireless apparatus to implement technical features of this description.

FIG. 15 is a block diagram showing a wireless apparatus to implement technical features of this description. This may be a part of a UE, an eNodeB/HeNodeB/HNodeB, or a core network (CN) entity. The wireless apparatus 1000 may include a processor 1010, a memory 1020 and a radio frequency (RF) unit 1030.

The processor 1010 may be configured to implement proposed functions, procedures and/or methods described in this description. Layers of the radio interface protocol may be implemented in the processor 1010. The processor 1010 may handle a procedure related unlicensed/licensed band operation. The memory 1020 is operatively coupled with the processor 1010, and the RF unit 1030 is operatively coupled with the processor 1010.

The processor 1010 may include application-specific integrated circuit (ASIC), other chipset, logic circuit and/or data processing device. The memory 1020 may include read-only memory (ROM), random access memory (RAM), flash memory, memory card, storage medium and/or other storage device. The RF unit 1030 may include baseband circuitry to process radio frequency signals. When the embodiments are implemented in software, the techniques described herein can be implemented with modules (e.g., procedures, functions, and so on) that perform the functions described herein. The modules can be stored in memory 1020 and executed by processor 1010. The memory 1020 can be implemented within the processor 1010 or external to the processor 1010 in which case those can be communicatively coupled to the processor 1010 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method of communicating data based on an unlicensed band in a wireless communication system comprising a first type base station and a second type base station which is different from the first type base station, the method comprising:

receiving, by the first type base station, first information associated with location of a user equipment (UE) connected to the first type base station and with location of the second type base station;

determining, by the first type base station, whether or not the UE's location is near a cell boundary region between the first type base station and the second type base station, based on the first information;
when the UE's location is not near the cell boundary region, determining, by the first type base station, whether to instruct the second type base station to operate on the unlicensed band; and
instructing, by the first type base station, the second type base station to operate on the unlicensed band, wherein available radio resources for the unlicensed band are determined based on second information which is managed by the first type base station,
wherein the available radio resources for the unlicensed band are defined based on orthogonal frequency division multiplexing (OFDM) of third generation partnership project long term evolution (3GPP LTE) or 3GPP LTE-Advanced.

2. The method of claim 1, wherein the first type base station is a cellular base station, and the second type base station is a Femto-cell base station.

3. The method of claim 2, wherein the first information contains a measurement result of reference signal reception power (RSRP) or reference signal reception quality (RSRQ) and an identity of at least one Femto-cell base station included in a neighboring cell list of the UE.

4. The method of claim 3, further comprising:
identifying at least one Femto-cell base station incurring interference in downlink reception of the UE, wherein the second type base station instructed by the first type base station is the identified Femto-cell base station.

5. The method of claim 1, further comprising:
receiving, from the second type base station, report information on which radio resources are used by the second type base station.

6. The method of claim 1, wherein the unlicensed band includes Industrial, Scientific and Medical (ISM) bands, and Television White Spaces (TVWS) bands.

7. The method of claim 1, wherein the second information is obtained from a database managed by a central entity different from the first and second type base stations.

8. A method of communicating data based on an unlicensed band in a wireless communication system comprising a first type base station and a second type base station which is different from the first type base station, the method comprising:
receiving, by the second type base station, first information associated with location of a user equipment (UE) connected to the second type base station and with location of the first type base station;
determining, by the second type base station, whether or not the UE's location is near a cell boundary region between the first type base station and the second type base station, based on the first information;
when the UE's location is not near the cell boundary region, determining, by the second type base station, whether to operate on the unlicensed band; and
operating, by the second type base station, on the unlicensed band, wherein available radio resources for the unlicensed band are determined by second information which is managed by the first type base station,
wherein the available radio resources for the unlicensed band are defined based on orthogonal frequency division multiplexing (OFDM) of third generation partnership project long term evolution (3GPP LTE) or 3GPP LTE-Advanced.

9. The method of claim 8, wherein the first type base station is a cellular base station, and the second type base station is a Femto-cell base station.

10. The method of claim 9, wherein the UE is only connected to the second type base station, the first information contains a measurement result of reference signal reception power (RSRP) or reference signal reception quality (RSRQ), and the second type base station determines to operate on the unlicensed band when the UE connected to the second type base station is located near a cell boundary region between the cellular base station and the Femto-cell base station.

11. The method of claim 8, wherein the second information is obtained from a database managed by a central entity different from the first and second type base stations.

12. The method of claim 8, wherein the step of enabling comprises:
transmitting, to the first type base station, a control message informing that the second type base station will initiate unlicensed band operation.

13. The method of claim 8, wherein the step of enabling comprises:
receiving, from the first type base station, permission which allows the second type base station to operate on the unlicensed band.

14. A method of communicating data based on an unlicensed band in a wireless communication system comprising a first Femto-cell base station and a second Femto-cell base station, the method comprising:
receiving, by the first Femto-cell base station, first information associated with location of a user equipment (UE) connected to the first Femto-cell base station and with location of the second Femto-cell base station;
determining, by the first Femto-cell base station, whether or not the UE's location is near a cell boundary region between the first Femto-cell base station and the second Femto-cell base station, based on the first information;
when the UE's location is not near the cell boundary region, determining, by the first Femto-cell base station, whether to operate on the unlicensed band; and
operating, by the first Femto-cell base station, on the unlicensed band, wherein available radio resources for the unlicensed band are determined by second information which is managed by a cellular system,
wherein the available radio resources for the unlicensed band are defined based on orthogonal frequency division multiplexing (OFDM) of third generation partnership project long term evolution (3GPP LTE) or 3GPP LTE-Advanced.

15. The method of claim 14, further comprising:
transmitting, to a gateway of the Femto-cell base stations or a mobility management entity (MME), a control message requesting for operation of the unlicensed band.

16. The method of claim 14, the first information contains a measurement result of reference signal reception power (RSRP) or reference signal reception quality (RSRQ).

* * * * *